(12) United States Patent
Cropper et al.

(10) Patent No.: US 9,916,181 B2
(45) Date of Patent: *Mar. 13, 2018

(54) MANAGING ASSET PLACEMENT WITH RESPECT TO A SHARED POOL OF CONFIGURABLE COMPUTING RESOURCES

(71) Applicant: International Business Machines Corporation, Armonk, NY (US)

(72) Inventors: Joseph W. Cropper, Rochester, MN (US); Kyle L. Henderson, Mantorville, MN (US); Jennifer D. Mulsow, Cedar Park, TX (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/866,914

(22) Filed: Sep. 26, 2015

(65) Prior Publication Data

US 2017/0052825 A1 Feb. 23, 2017

Related U.S. Application Data

(63) Continuation of application No. 14/829,564, filed on Aug. 18, 2015.

(51) Int. Cl.
*G06F 9/455* (2006.01)
*G06F 9/50* (2006.01)

(52) U.S. Cl.
CPC ............ *G06F 9/50* (2013.01); *G06F 9/45558* (2013.01); *G06F 9/5016* (2013.01);
(Continued)

(58) Field of Classification Search
CPC ......... G06F 2209/503; G06F 2209/504; G06F 2009/4557; G06F 2009/45562;
(Continued)

(56) References Cited

U.S. PATENT DOCUMENTS 8,738,972 B1 * 5/2014 Bakman .............. G06F 11/0712
714/47.1
2010/0050172 A1 * 2/2010 Ferris .................... G06F 9/5072
718/1

(Continued)

FOREIGN PATENT DOCUMENTS

WO 2013165354 A1 11/2013

OTHER PUBLICATIONS

Mell, Peter, et al., The NIST Definition of Cloud Computing, National Institute of Standards and Technology, Oct. 7, 2009, Version 15, NIST, Gaithersburg, MD, US, 2 pages.

(Continued)

*Primary Examiner* — James J Lee
(74) *Attorney, Agent, or Firm* — Michael Purdham

(57) ABSTRACT

Disclosed aspects include managing asset placement with respect to a shared pool of configurable computing resources. A first set of first resource values is detected with respect to a set of assets. The first set of first resource values includes a first value. A second set of first resource values is detected with respect to the set of assets. The second set of first resource values includes a second value. The second value exceeds the first value. A set of asset weight values is detected with respect to the set of assets. The set of asset weight values indicates an asset utilization arrangement. A placement arrangement is determined for the set of assets using the first set of first resource values, the second set of first resource values, and the set of asset weight values. Accordingly, the set of assets is placed based on the placement arrangement.

13 Claims, 13 Drawing Sheets

(52) U.S. Cl.
CPC .......... *G06F 9/5022* (2013.01); *G06F 9/5055* (2013.01); *G06F 9/5077* (2013.01); *G06F 2009/4557* (2013.01)

(58) Field of Classification Search
CPC ............. G06F 9/45558; G06F 9/45533; G06F 9/5077; G06F 9/5072; G06F 9/50; G06F 9/5016
See application file for complete search history.

(56) References Cited

U.S. PATENT DOCUMENTS

| | | | | |
|---|---|---|---|---|
| 2010/0242045 A1* | 9/2010 | Swamy | .................... | G06F 9/455 718/104 |
| 2010/0306382 A1 | 12/2010 | Cardosa et al. | | |
| 2011/0247005 A1 | 10/2011 | Benedetti et al. | | |
| 2011/0302578 A1* | 12/2011 | Isci | ....................... | G06F 9/5077 718/1 |
| 2012/0210042 A1* | 8/2012 | Lim | .................... | G06F 12/0223 711/6 |
| 2014/0059207 A1 | 2/2014 | Gulati et al. | | |
| 2014/0137104 A1* | 5/2014 | Nelson | ................ | G06F 9/45558 718/1 |
| 2016/0164797 A1* | 6/2016 | Reque | .................... | G06F 9/445 718/1 |
| 2016/0248646 A1* | 8/2016 | Ashby, Jr. | ............... | H04L 47/78 |

OTHER PUBLICATIONS

Anonymously, A resource score based method to provision virtual machines in a cloud system, IP.COM, Jul. 25, 2012, 3 pages.
Software Patent Institute et al., Virtual Memory, IP.COM, Apr. 17, 2007, 97 pages.
Amazon Web Services, Amazon EC2 Instances, aws.amazon.com/ec2/instance-types/#burst>, Aug. 18, 2015, 19 pages.
Pedersen, Frank B., Understanding VMware Reservations Limits and Shares, vfrank.org/2013/09/19/understanding-vmware-reservations-limits-and-shares/>, Sep. 19, 2013, 8 pages.
Epping, Duncan, DRS Deepdive, yellow-bricks.com/drs-deepdive/>. Aug. 18, 2015, 5 pages.
Cler, Charlie, Configuring Processor Resources for System p5 Shared-Processor Pool Micro-Partitions, IBM Systems Magazine, ibmsystemsmag.com/aix/administrator/systemsmanagement/Configuring-Processor-Resources-for-System-p5-Shar/?page=3>, Aug. 2006, 3 pages.
Cropper et al., "Managing Asset Placement With Respect to a Shared Pool of Configurable Computing Resources", U.S. Appl. No. 14/829,564, filed Aug. 18, 2015.
List of IBM Patents or Patent Applications Treated As Related.

* cited by examiner

600

Manage resource contention
661

FIG. 6

MANAGING ASSET PLACEMENT WITH RESPECT TO A SHARED POOL OF CONFIGURABLE COMPUTING RESOURCES

CROSS-REFERENCE TO RELATED APPLICATIONS

This application is a continuation of the co-pending application Ser. No. 14/829,564.

BACKGROUND

This disclosure relates generally to computer systems and, more particularly, relates to managing asset placement with respect to a shared pool of configurable computing resources. The amount of data that needs to be managed by enterprises is increasing. Asset placement may be desired to be performed as efficiently as possible. As data needing to be managed increases, the need for efficient asset placement management may increase.

Cloud consumers may request a guaranteed minimum level of performance for their applications. The cloud consumers may prefer better performance than the minimum. Existing solutions may not be cost-effective for cloud providers. Over-commitment of resources is generally avoided because performance may not be able to be guaranteed. One approach cloud providers use is to assign dedicated hardware to the consumer. The consumer gets their guaranteed performance without losing capacity to other workloads sharing the resources. However, for the provider, the dedicated hardware model can be inefficient/burdensome.

Another model includes the pooling of hardware resources. Assets can be placed assuming 100% of the resources specified for the asset are available. Placement may limit granularity of the resource allocation. Also, assets such as virtual machines can be moved from one host to another to make room for new or changed virtual machines. However, moving virtual machines from one host to another can impact the availability of the virtual machine and is itself an operation which utilizes resources. Accordingly, cloud consumers/providers may benefit from being able to specify various resource values or asset weights.

SUMMARY

Aspects of the disclosure include managing asset placement with respect to a shared pool of configurable computing resources. A first set of first resource values is detected with respect to a set of assets. The first set of first resource values includes a first value. A second set of first resource values is detected with respect to the set of assets. The second set of first resource values includes a second value. The second value exceeds the first value. A set of asset weight values is detected with respect to the set of assets. The set of asset weight values indicates an asset utilization arrangement. A placement arrangement is determined for the set of assets using the first set of first resource values, the second set of first resource values, and the set of asset weight values. Accordingly, the set of assets is placed based on the placement arrangement.

In embodiments, the set of assets includes a set of virtual machines. The first set of first resource values may include a set of threshold values (e.g., minimum values). The set of threshold values can be for a first set of processor resource values or a first set of memory resource values. The second set of first resource values may include a set of target values (e.g., desired values). The set of target values can be for a second set of processor resource values or a second set of memory resource values. The asset utilization arrangement can include a prioritization for the set of virtual machines. Performance or efficiency benefits with respect to a shared pool of configurable computing resources may occur (e.g., speed, flexibility, responsiveness, resource usage, productivity). Aspects may save resources such as bandwidth, processing, or memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 is a flowchart illustrating a set of asset placement operations according to embodiments.

Figure 1:
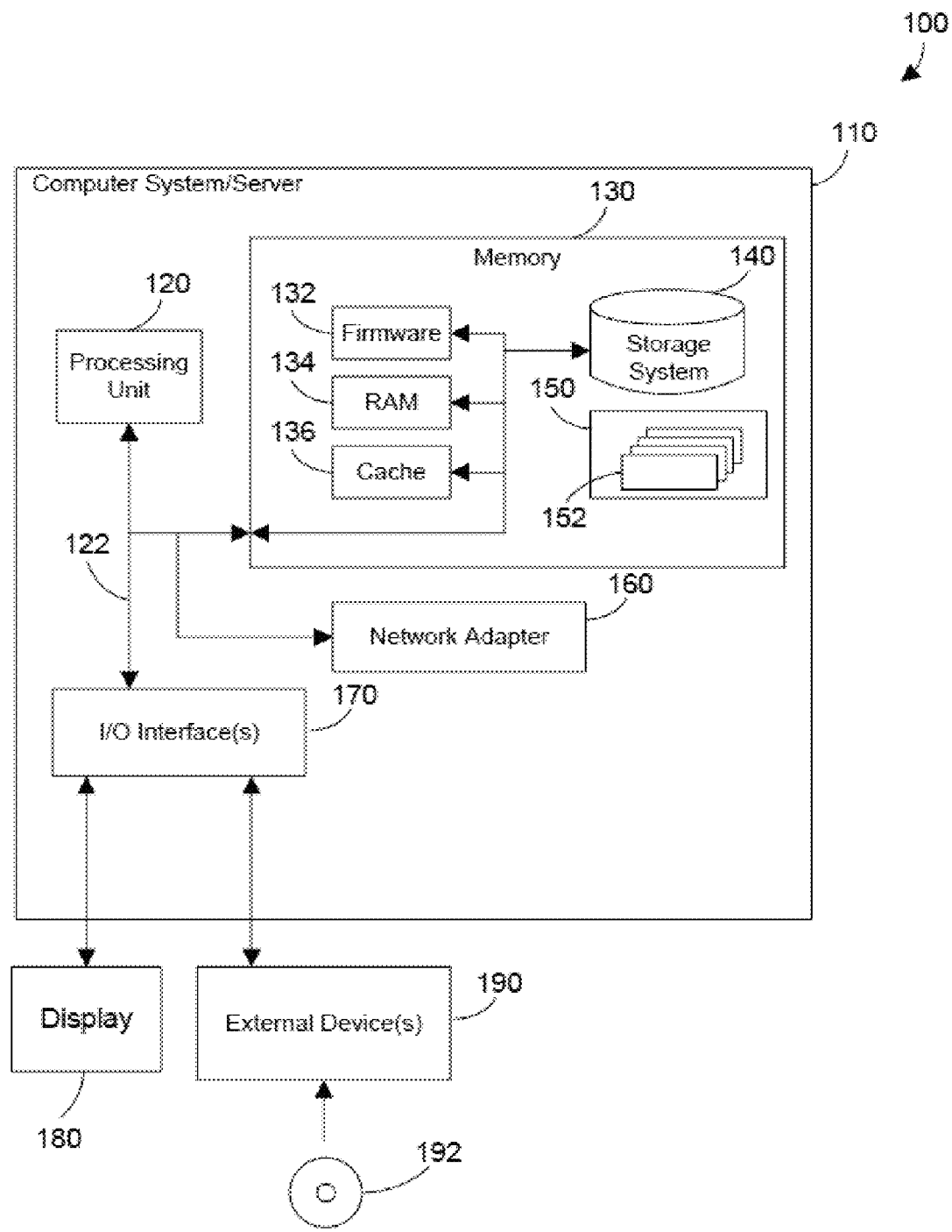
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include managing asset placement (e.g., virtual machine placement) with respect to shared processor and memory capacity using logic. The ability of a hypervisor to share with a certain level of resource capacity may be leveraged. As described herein, asset placement can use values specified on a deploy or resize operation which state a threshold value (e.g., minimum, need), a target value (e.g., desired, want), and a set of asset weight values for the set of assets in order to balance thresholds and targets for positive impacts utilization. As such, performance or efficiency benefits may result (e.g., relative to placing assets based on an assumption that 100% of the asset configuration or 100% of the target capacity is available).

In embodiments, interfaces may be leveraged for deploying or resizing an asset including templates/flavors. The templates/flavors can have a specification of the threshold and target values for resources such as processor speed, number of processors, amount of memory, etc. Embodiments may leverage specification for whether the resource can exceed its target value (e.g., thereby being uncapped) and at what ratio (e.g., asset weight value) a particular asset may receive unused resource capacity relative to other uncapped assets.

Cloud consumers may request a guaranteed minimum level of performance for their applications. The cloud consumers may prefer better performance than the minimum. Existing solutions may not be cost-effective for cloud providers. Over-commitment of resources is generally avoided because performance may not be able to be guaranteed. One approach cloud providers use is to assign dedicated hardware to the consumer. The consumer gets their guaranteed performance without losing capacity to other workloads sharing the resources. However, for the provider, the dedicated hardware model can be inefficient/burdensome (e.g., costly).

Another model includes the pooling of hardware resources. Assets can be placed assuming 100% of the resources specified for the asset are available. For processors, placement considers the number of virtual processors with the assumption that the processors in the pool are similar in terms of processor speed. Such placement may limit granularity of the resource allocation. Also, assets such as virtual machines can be moved from one host to another to make room for new or changed virtual machines. However, moving virtual machines from one host to another can impact the availability of the virtual machine and is itself an operation which utilizes resources. Accordingly, cloud consumers/providers may benefit from being able to specify the threshold/minimum resource value (e.g., speed of the processor, size of the memory) they need, what target resource value (e.g., speed, size) they desire/want, various other resource values/levels, and a weighting of a virtual machine relative to other virtual machines (and have that weight used for placement of the virtual machine).

Aspects of the disclosure include a method, system, and computer program product for managing asset placement with respect to a shared pool of configurable computing resources. A first set of first resource values is detected with respect to a set of assets. The first set of first resource values includes a first value. A second set of first resource values is detected with respect to the set of assets. The second set of first resource values includes a second value. The second value exceeds the first value. A set of asset weight values is detected with respect to the set of assets. The set of asset weight values indicates an asset utilization arrangement. A placement arrangement is determined for the set of assets using the first set of first resource values, the second set of first resource values, and the set of asset weight values. Accordingly, the set of assets is placed based on the placement arrangement.

In embodiments, the set of assets includes a set of virtual machines. The first set of first resource values may include a set of threshold values (e.g., minimum values). The set of threshold values can be for a first set of processor resource values or a first set of memory resource values. The second set of first resource values may include a set of target values (e.g., desired values). The set of target values can be for a second set of processor resource values or a second set of memory resource values. The asset utilization arrangement can include a prioritization for the set of virtual machines.

Aspects of the disclosure include a method, system, and computer program product for managing a set of assets with respect to a shared pool of configurable computing resources. A set of asset weight values is detected with respect to the set of assets. The set of asset weight values indicates an asset utilization arrangement. It is determined that a first resource usage exceeds a threshold value for the shared pool of configurable computing resources. Based on the set of asset weight values, a first asset of the set of assets is identified to be resized. Accordingly, the first asset is resized. Altogether, performance or efficiency benefits with respect to a shared pool of configurable computing resources may occur (e.g., speed, flexibility, responsiveness, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
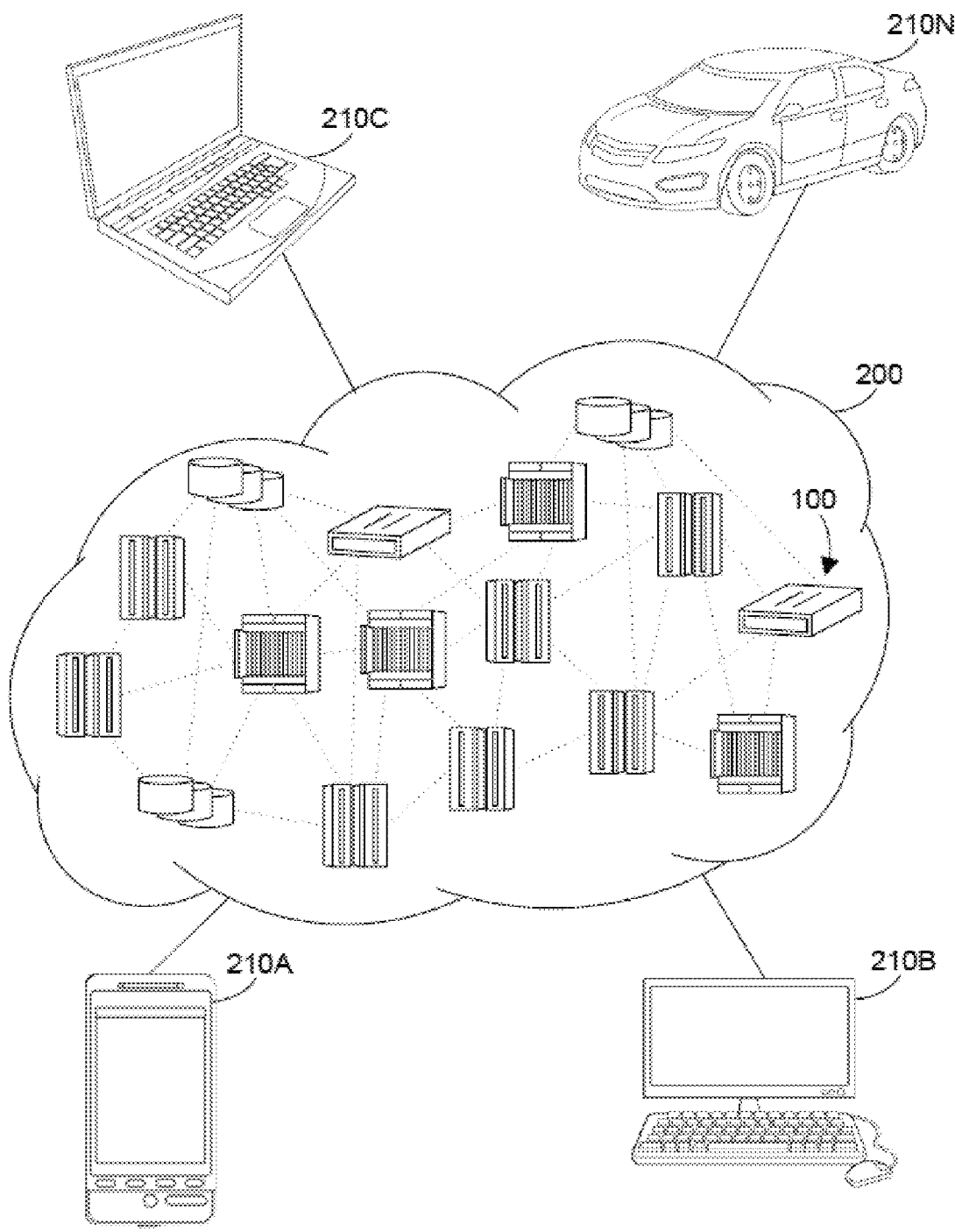
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
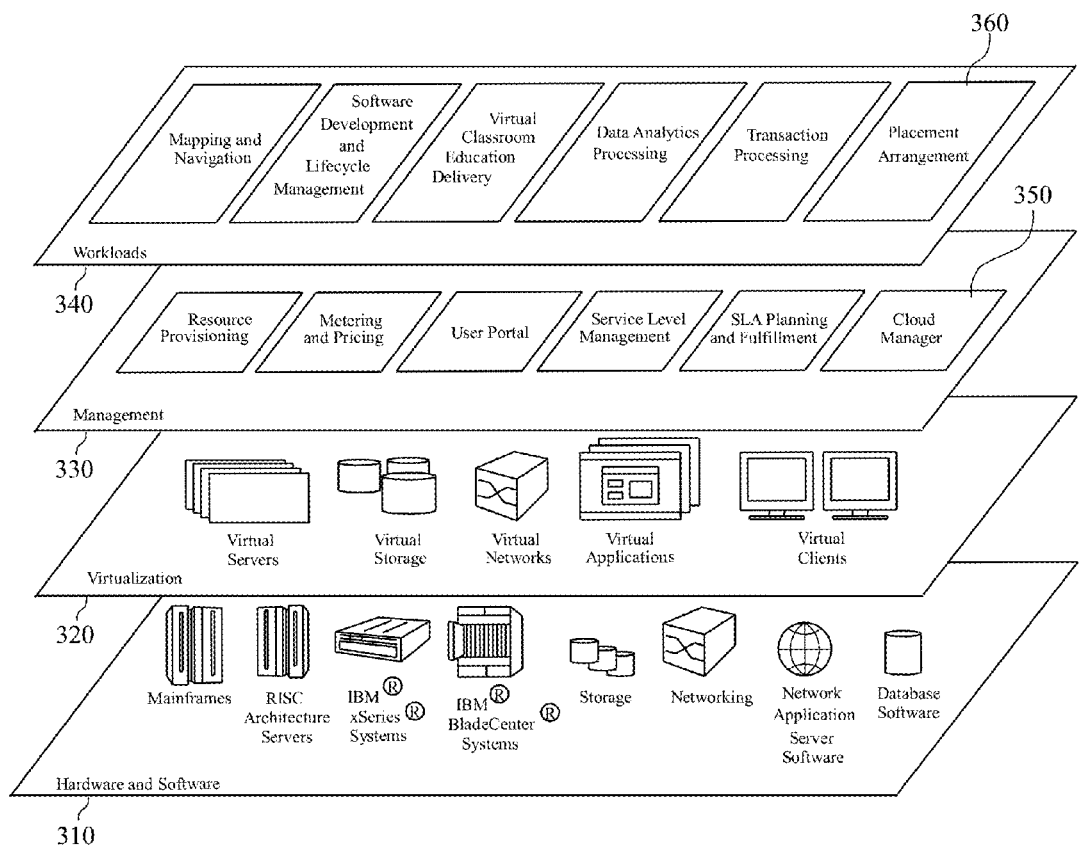
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a placement arrangement 360, which may be utilized as discussed in more detail below.

Figure 4:
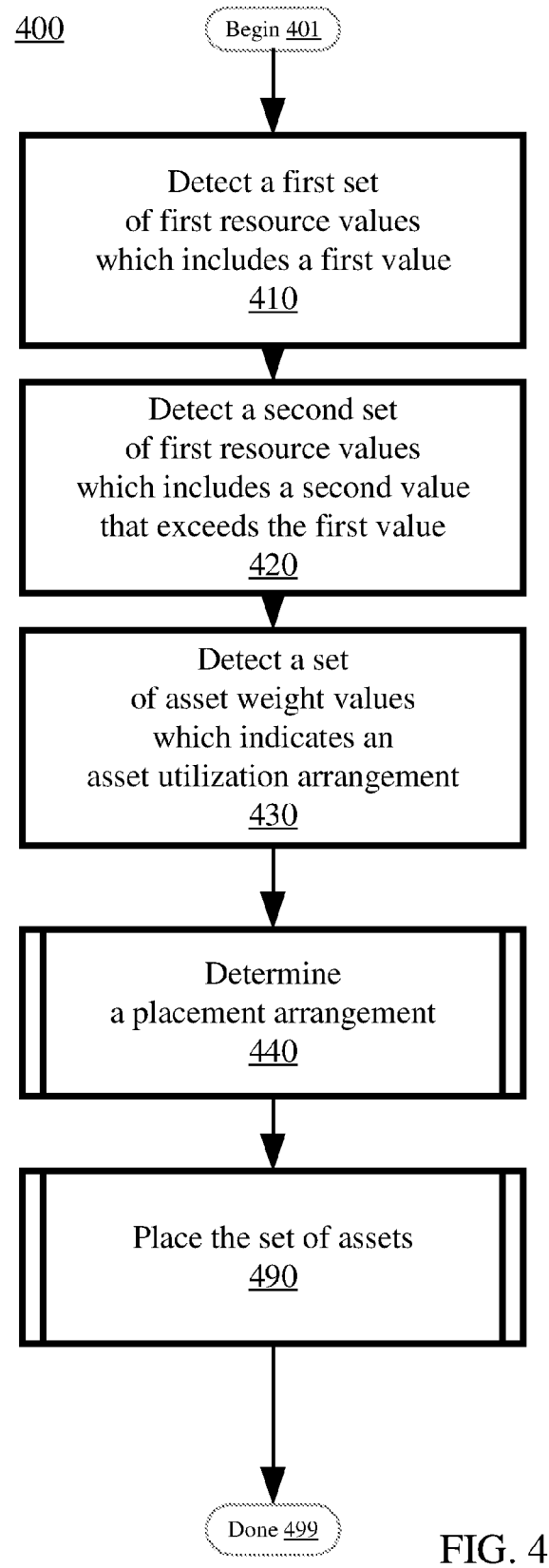
FIG. 4 is a flowchart illustrating a method of managing asset placement with respect to a shared pool of configurable computing resources according to embodiments.

FIG. 4 is a flowchart illustrating a method of managing asset placement with respect to a shared pool of configurable computing resources according to embodiments. When deploying an asset on a host, the process of selecting the most suitable host for the asset can be termed placement. Considerations for placement include hardware/resource requirements and anticipated usage of resources. Illustrative placement initiatives can include efficient resource utilization on individual hosts or load balancing among hosts (e.g., for performance benefits). Method 400 may begin at block 401. In embodiments, a set of assets (to be placed) includes a set of virtual machines. Other assets are contemplated such as various software application programs.

At block 410, a first set of first resource values is detected (e.g., received, collected) with respect to the set of assets. The first set of first resource values includes a first value. The first set of first resource values may include a set of threshold values (e.g., minimum values). The set of threshold values can be for a first set of processor resource values (e.g., 2 gigahertz, 20% of processor) or a first set of memory resource values (e.g., 2 terabytes, 20% of memory).

At block 420, a second set of first resource values is detected with respect to the set of assets. The second set of first resource values includes a second value. The second value exceeds the first value. The second set of first resource values may include a set of target values (e.g., desired values). The set of target values can be for a second set of processor resource values (e.g., 3 gigahertz, 30% of processor) or a second set of memory resource values (e.g., 3 terabytes, 30% of memory).

At block 430, a set of asset weight values is detected with respect to the set of assets. The set of asset weight values indicates an asset utilization arrangement. In general, the asset utilization arrangement can indicate a prioritization, superiority, ordering, or relative relationship for the set of assets (e.g., the asset utilization arrangement can include a prioritization for the set of virtual machines). The asset utilization arrangement can include a ranking operation or a ranked database. A more substantially weighted asset may be provided more resources relative to a less substantially weighted asset (e.g., with respect to allocation of resources when a resource excess exists). For example, consider when a first virtual machine is weighted at 50, a second virtual machine is weighted at 33, and a third virtual machine is weighted at 17. Accordingly, free resources can be proportioned with 50% going to the first virtual machine, 33% going to the second virtual machine, and 17% going to the third virtual machine.

At block 440, a placement arrangement is determined for the set of assets using the first set of first resource values, the second set of first resource values, and the set of asset weight values. The placement arrangement may include a configuration for deployment of various virtual machines (e.g., to a plurality of hosts). An example placement arrangement may prioritize accommodation of the target/desired values (e.g., high performance). When ties occur, the host with a lesser shared resource contention may be chosen for placement (e.g., relatively higher expected performance/efficiency). If placement is thereafter incomplete, a host may be chosen by searching for a host based on the threshold/minimum values (e.g., at least meet requirements). Other placement arrangements are considered (e.g., balancing performance differently across groups of hosts, using any number of resource values/levels).

Embodiments may include first resource values being processor resource values and second resource values being memory resource values. In an illustrative embodiment, a first set of second resource values can be detected at block 410 (with respect to a set of assets) which includes a third value, in addition to the first set of first resource values and first value. Also, a second set of second resource values can be detected at block 420 (with respect to a set of assets) which includes a fourth value, in addition to the second set of first resource values and second value. The fourth value may exceed the third value. Using the first set of second resource values and the second set of second resource values, the placement arrangement for the set of assets may be determined at block 440. Altogether, in such embodiments, both processor and memory resource values may be factored into the placement arrangement via the determination.

At block 490, the set of assets is placed based on the placement arrangement. Example placement arrangements may place assets with a relatively high chance of having substantial resource capacity across the hosts, deliver relatively fewer relocation instances (e.g., moving assets from one host to another due to insufficient resources), or place assets even when the target resource value (e.g., desired capacity) fails to be available. In embodiments, use of the placement arrangement can be metered. An invoice may be generated based on the metered use.

Method 400 concludes at block 499. Aspects of method 400 may provide performance or efficiency benefits for managing asset placement (e.g., for use with respect to flexible workloads). For example, aspects of method 400 may have positive impacts with respect to resource usage of a shared pool of configurable computing resources. Altogether, performance or efficiency benefits when managing asset placement with respect to a shared pool of configurable computing resources may occur (e.g., speed, flexibility, responsiveness, resource usage, productivity).

Figure 5:
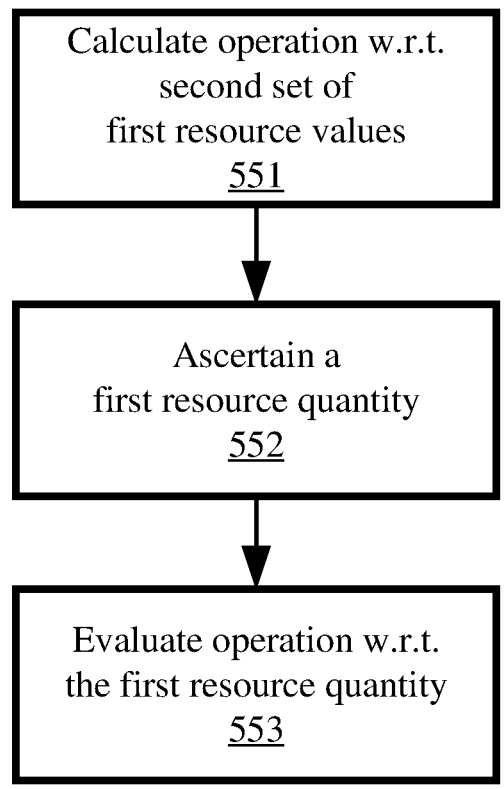
FIG. 5 is a flowchart illustrating a set of asset placement operations according to embodiments.

FIG. 5 is a flowchart illustrating a set of asset placement operations 500 according to embodiments. The set of asset placement operations 500 may be at least a part of determining the placement arrangement for the set of assets (e.g., block 440). A mathematical operation may be calculated at block 551. The mathematical/arithmetic/statistical operation (e.g., summation) may be calculated with respect to the second set of first resource values (e.g., target processing/memory power) on a host of the shared pool of configurable computing resources. A first resource quantity (e.g., total number of processors/memory) can be ascertained for the host at block 552. The mathematical operation may be evaluated (e.g., performing a division calculation) with respect to the first resource quantity at block 553. For example, a host that has a significant/most processing capacity remaining after target/desired capacity for the set of assets (e.g., virtual machines) is accounted-for can be selected. As such, the set of asset placement operations (e.g., policy) can be configured to place assets on the host with a lesser/lowest value when dividing the sum of target/desired values for assets on a host (e.g., including a new/changed asset) by the resource quantity on the host.

Figure 6:
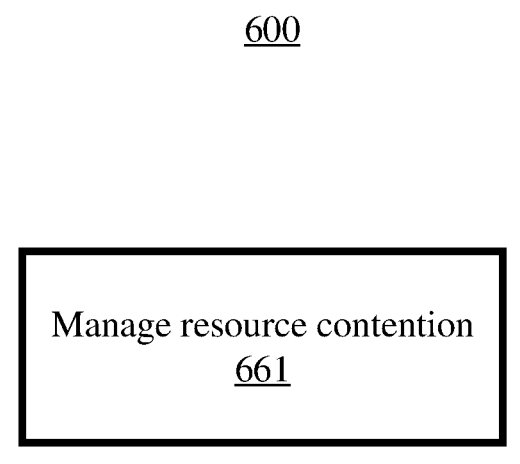

FIG. 6 is a flowchart illustrating a set of asset placement operations 600 according to embodiments. The set of asset placement operations 600 may be at least a part of determining the placement arrangement for the set of assets (e.g., block 440). Resource contention may be managed based on the set of asset weight values at block 661. For example, If the lower/lowest processor capacity (e.g., remaining from the set of placement operations 500) is substantially the same (e.g., identical) across several hosts, a host may be selected to improve/reduce/minimize processor contention based on the set of asset weight values (e.g., to prioritize more heavily weighted assets).

Figure 7:
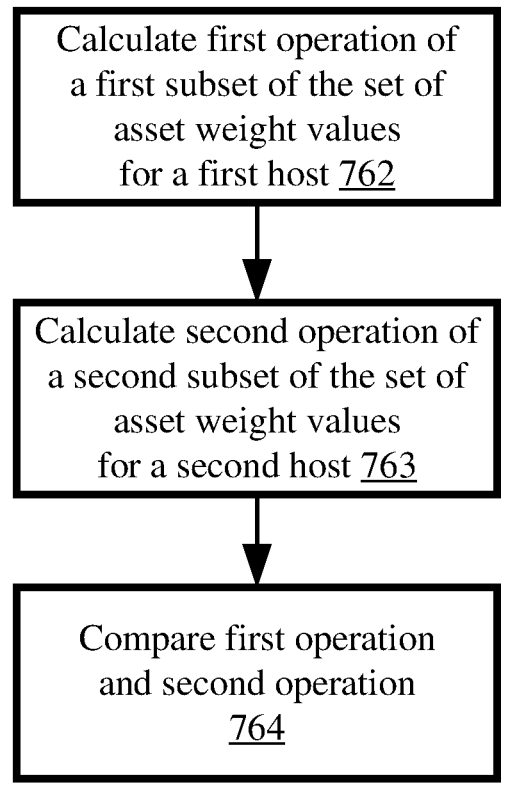
FIG. 7 is a flowchart illustrating a set of asset placement operations according to embodiments.

FIG. 7 is a flowchart illustrating a set of asset placement operations 700 according to embodiments. The set of asset placement operations 700 may be at least a part of determining the placement arrangement for the set of assets (e.g., block 440). A first mathematical operation (e.g., summation) of a first subset of the set of asset weight values for a first host of the shared pool of configurable computing resources can be calculated at block 762. A second mathematical operation of a second subset of the set of asset weight values for a second host of the shared pool of configurable computing resources can be calculated at block 763. The first mathematical operation and the second mathematical operation may be compared at block 764. Accordingly, in certain illustrative embodiments, the host having a lower/lowest sum of asset weight values may be chosen.

Figure 8:
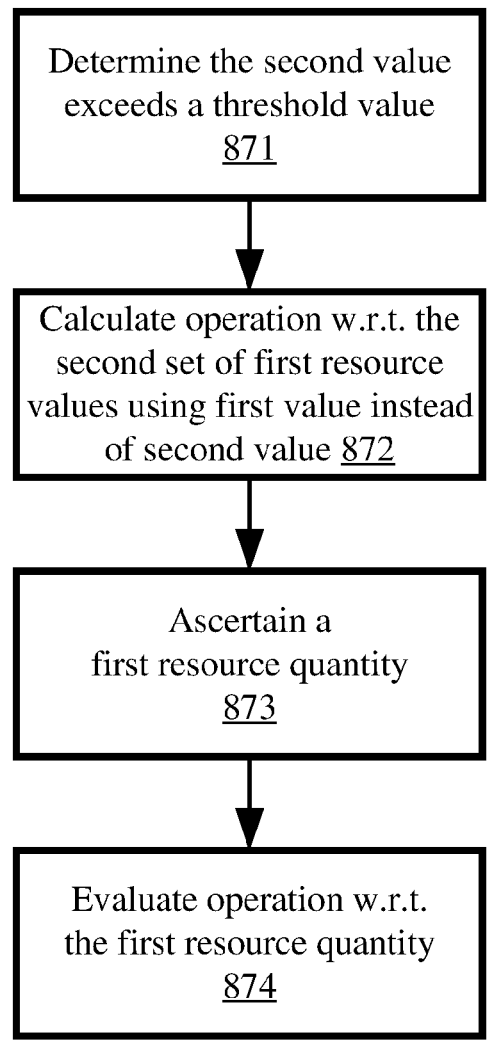
FIG. 8 is a flowchart illustrating a set of asset placement operations according to embodiments.

FIG. 8 is a flowchart illustrating a set of asset placement operations 800 according to embodiments. The set of asset placement operations 800 may be at least a part of determining the placement arrangement for the set of assets (e.g., block 440). It may be determined/identified/detected that the second value exceeds a threshold value (e.g., the target value exceeds a current/past/future capacity value) for the shared pool of configurable computing resources at block 871. A mathematical operation (e.g., summation) may be calculated with respect to the second set of first resource values on a host of the shared pool of configurable computing resources at block 872. The mathematical operation can use the first value (e.g., threshold/minimum) instead of the second value (e.g., target/desired). A first resource quantity (e.g., number of processors or memory devices) may be ascertained for the host at block 873.

The mathematical operation may be evaluated with respect to the first resource quantity at block 874 (e.g., dividing the summation of resource values by the number of resources, computing a statistical measure, averaging). For example, if no host has capacity for a target processor value, a host may be selected that has a significant/most processor capacity remaining after existing asset target capacity is accounted-for plus the threshold/minimum capacity for the new/changed asset. As such, the set of asset placement operations can be used to place assets (e.g., virtual machines) on the host having the lower/lowest value when dividing the sum of the target/desired values for existing assets on a host and the threshold/minimum value for new/changed asset by the total number of processors on the host.

Figure 9:
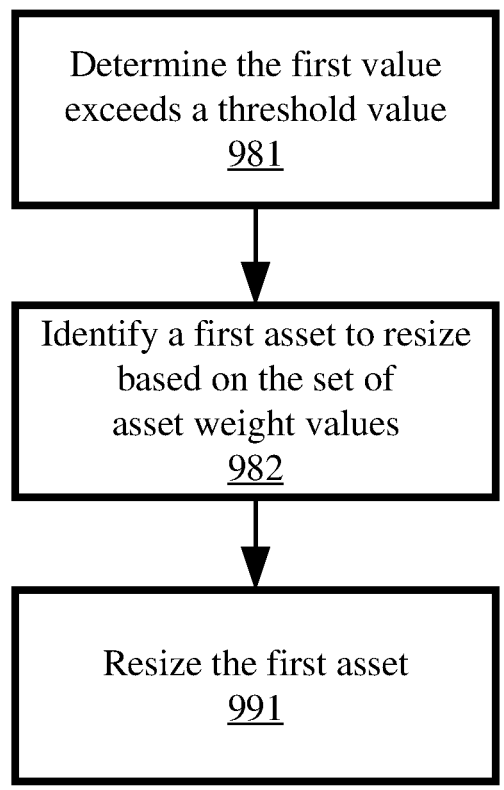
FIG. 9 is a flowchart illustrating a set of asset placement operations according to embodiments.

FIG. 9 is a flowchart illustrating a set of asset placement operations 900 according to embodiments. The set of asset placement operations 900 may be at least a part of determining the placement arrangement for the set of assets (e.g., block 440) or placing the set of assets based on the placement arrangement (e.g., block 490). It may be determined that the first value exceeds a threshold value (e.g., the threshold/minimum value exceeds a current/past/future capacity value) for the shared pool of configurable computing resources at block 981. Based on the set of asset weight values, a first asset of the set of assets is identified to be resized at block 982. The first asset can be resized at block 991.

For example, consider if no host has capacity for the threshold/minimum capacity of the asset based on processor capacity remaining after existing assets target/desired capacity is accounted-for. Accordingly, starting with the asset with a lower/lowest value calculated using the set of asset placement operations 800, find assets with lower weights than the asset that is being placed. Starting with the asset with a lower/lowest weight, start resizing those assets (e.g., down to their threshold/minimum resource requirements) until there are enough resources on the host to honor the threshold/minimum resource requirement of the asset being placed.

Figure 10:
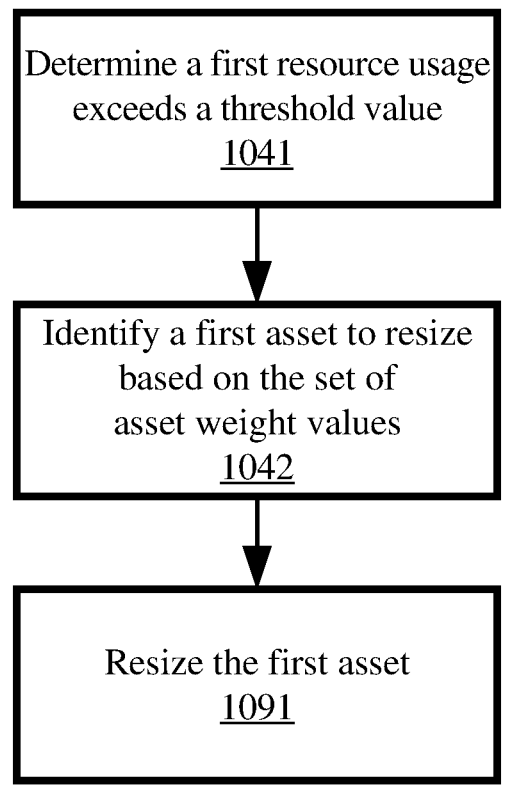
FIG. 10 is a flowchart illustrating a set of asset placement operations according to embodiments.

FIG. 10 is a flowchart illustrating a set of asset placement operations 1000 according to embodiments. The set of asset placement operations 1000 may be at least a part of determining the placement arrangement for the set of assets (e.g., block 440) or placing the set of assets based on the placement arrangement (e.g., block 490). It may be determined that a first resource usage (e.g., processor/memory usage) exceeds a threshold value (e.g., of processor/memory usage) for the shared pool of configurable computing resources at block 1041. Based on the set of asset weight values, a first asset of the set of assets is identified to be resized at block 1042. The first asset can be resized at block 1091.

For example, aspects can include an ongoing management/optimization for performance or efficiency benefits. It is contemplated that such management could be manifested to the administrator as an option to perform ongoing operations/management/optimization to tightly pack hosts when configured thresholds values are reached for resource utilization. If a host's capacity thresholds are being reached, rather than moving an asset such as a virtual machine off of the host to another host, such operations/policies may resize the assets with lower/lowest asset weight values (e.g., to their threshold/minimum requirements). As such, performance or efficiency benefits may result from the hosts not being too loosely packed (e.g. the virtual machines have their target/desired resource values allocated when there could be more room if they had their threshold/minimum resource values allocated).

Figure 11:
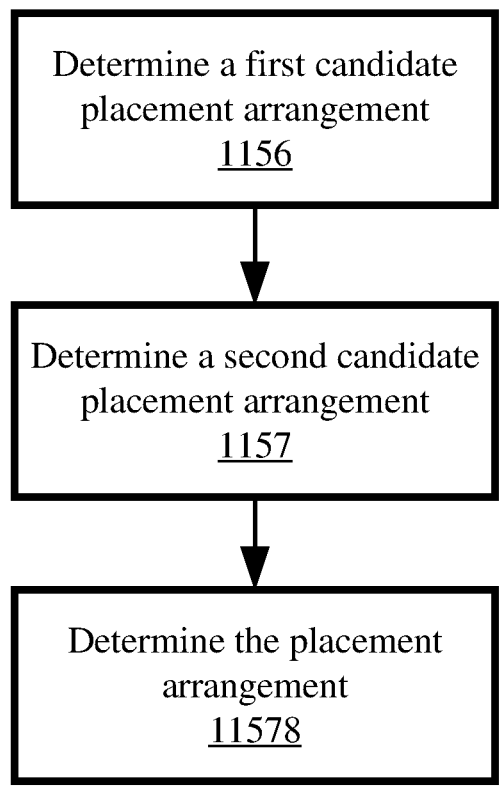
FIG. 11 is a flowchart illustrating a set of asset placement operations according to embodiments.

FIG. 11 is a flowchart illustrating a set of asset placement operations 1100 according to embodiments. The set of asset placement operations 1100 may be at least a part of determining the placement arrangement for the set of assets (e.g., block 440). An expected usage of a first resource may be managed. Management can include positive impacts on performance or efficiency (e.g., optimization) such as fewer asset relocations. Processor/memory resources can include future/projected utilization quantities/amounts which can be leveraged by aspects described herein.

In embodiments, a first candidate placement arrangement having a first expected usage (e.g., anticipated capacity) of a first resource (e.g., processor/memory) can be determined at block 1156. A second candidate placement arrangement having a second expected usage of the first resource may be determined at block 1157. By comparing the first and second expected usages of the first resource, the placement arrangement may be determined at block 1158. As such, the placement arrangement includes a selection of one of the first and second candidate placement arrangements (e.g., based on expected usage). In embodiments, based on the set of asset weight values, the expected usage of the first resource may be configured using a third value (e.g., higher/maximum value) that exceeds the second value (e.g., target/desired value). Accordingly, uncapped resource usages are considered (e.g., for flexibility, responsiveness, performance).

Figure 12:
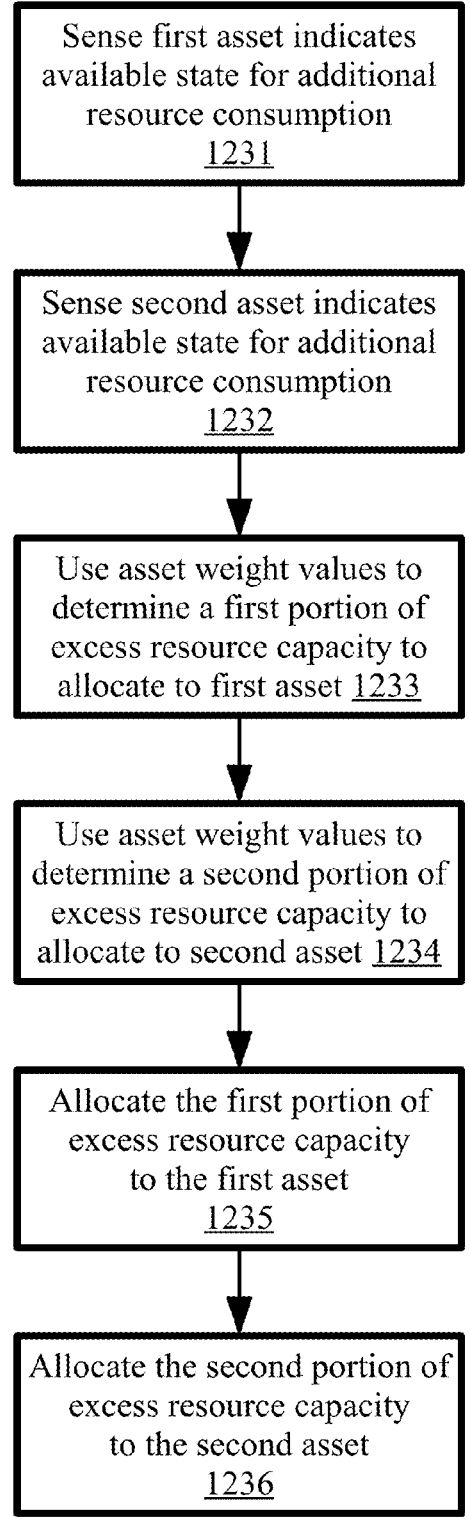
FIG. 12 is a flowchart illustrating a set of asset placement operations according to embodiments.

FIG. 12 is a flowchart illustrating a set of asset placement operations 1200 according to embodiments. The set of placement operation 1200 may describe how the set of asset weight values can be utilized. To illustrate, the set of asset weight values may determine a percentage of excess resource (e.g., processor/memory) capacity (if any) is given to an asset (e.g., virtual machine) if there are multiple assets that are capable of consuming additional resources. For instance, a first asset with an asset weight value of 75 may receive three times as much resources as a second asset with an asset weight value of 25. In embodiments, allocation other than strict proportions are also considered (e.g., after receiving twice as much as the next closest asset only half as much as normally is allocated to the most heavily weighted asset).

Accordingly, it may be sensed/detected that the set of assets includes a first asset which indicates an available state for additional resource consumption at block 1231. Similarly, it may be sensed/detected that the set of assets includes a second asset which indicates the available state for additional resource consumption at block 1232. Using the set of asset weight values, it may be determined to allocate to the first asset a first portion of excess resource capacity at block 1233. Using the set of asset weight values, it may be determined to allocate to the second asset a second portion of excess resource capacity at block 1234. As such, the first portion of excess resource capacity may be allocated to the first asset at block 1235 and the second portion of excess resource capacity may be allocated to the second asset at block 1236.

Figure 13:
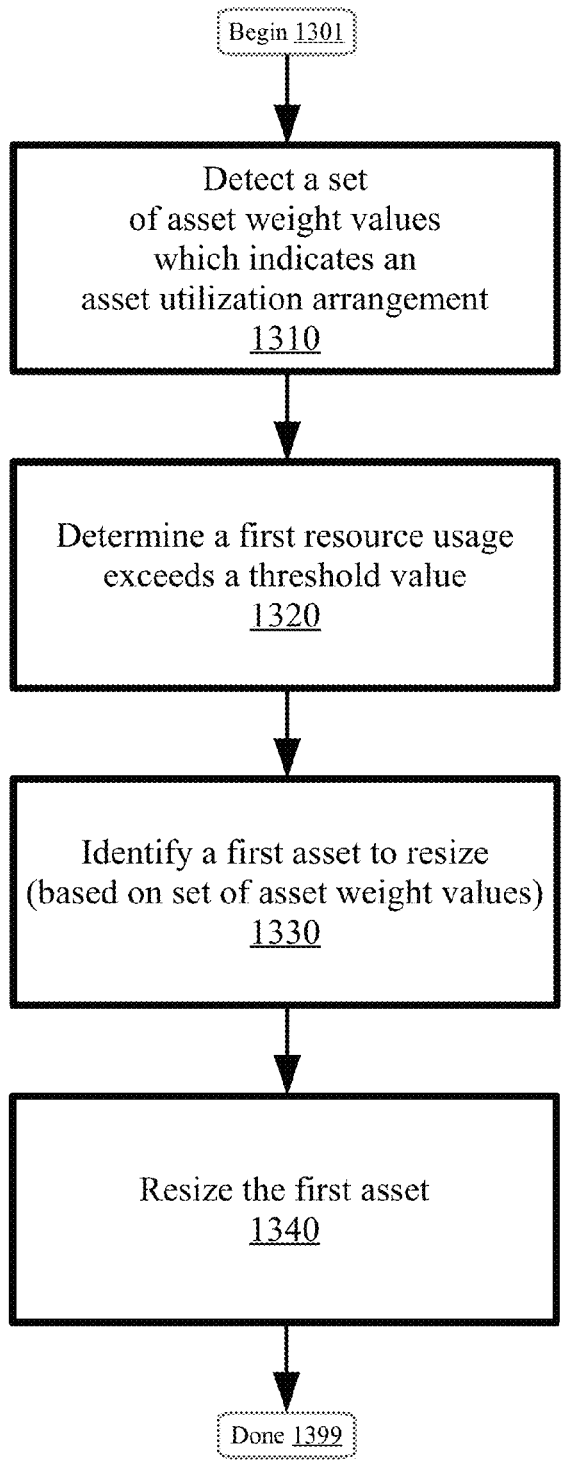
FIG. 13 is a flowchart illustrating a method of managing a set of assets with respect to a shared pool of configurable computing resources according to embodiments.

FIG. 13 is a flowchart illustrating a method of managing a set of assets with respect to a shared pool of configurable computing resources according to embodiments. Method 1300 may begin at block 1301. At block 1310, set of asset weight values may be detected with respect to the set of assets. The set of asset weight values can indicate an asset utilization arrangement. At block 1320, a determination is made that a first resource usage exceeds a threshold value for the shared pool of configurable computing resources. At block 1330, based on the set of asset weight values, a first asset of the set of assets is identified to be resized. At block 1340, the first asset is resized. Method 1300 concludes at block 1399

For example, aspects can include an ongoing management/optimization for performance or efficiency benefits. It is contemplated that such management could be manifested to the administrator as an option to perform ongoing operations/management/optimization to tightly pack hosts when configured thresholds values are reached for resource utilization. If a host's capacity thresholds are being reached, rather than moving an asset such as a virtual machine off of the host to another host, such operations/policies may resize the assets with lower/lowest asset weight values (e.g., to their threshold/minimum requirements). As such, performance or efficiency benefits may result from the hosts not being too loosely packed (e.g. the virtual machines have their target/desired resource values allocated when there could be more room if they had their threshold/minimum resource values allocated).

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

As described herein, aspects of the disclosure are directed toward managing placement of assets (e.g., virtual machines) with respect to one or more hosts based on target/threshold values. In embodiments, the target/threshold values may be specified by a user or system administrator based on available memory or processing resources of a local computing system architecture. Consider the following example. A particular cloud environment including four host devices may be designated to receive placement of a set of six virtual machines. A system administrator of the six virtual machines may submit a resource request with respect to the set of virtual machines that specifies a first set of resource values and a second set of resource values. The first set of resource values may include threshold values that indicate a lower limit of the resources requested from the host devices for allocation to the virtual devices. For instance, the set of threshold values may specify 60 gigahertz of processing power and 40 terabytes of memory. The second set of resource values specified in the resource request may include target values that indicate the desired amount of resources requested for deployment. For instance, the set of target values may specify 100 gigahertz of processing power and 80 terabytes of memory.

Consistent with embodiments described herein, placement for the six virtual machines on the host devices may be determined based on the threshold values and the target values specified in the resource request. The placement of the virtual machines on the host devices may be performed in one or more of a number of ways. In embodiments, the requested resources may be allocated to the 6 virtual machines based on the threshold values and target values specified by the user, as well as a set of asset weight values that indicate a prioritization of the set of assets. For instance, a first virtual machine may be weighted at 38, a second virtual machine weighted at 21, a third virtual machine weighted at 15, a fourth virtual machine weighted at 11, a fifth virtual machine weighted at 8, and a sixth virtual machine weighted at 7. As described herein, the asset weights may indicate a percentage of the requested resources desired for allocation to each virtual machine. Accordingly, a requested resource range may be calculated for each virtual machine using the asset weights, the threshold values, and the target values. For instance, with respect to the requested resource values specified in the example herein, a resource range of 22.8-38.0 gigahertz of processing power and 15.2-30.4 terabytes of memory may be calculated for the first virtual machine (e.g., 38% of both the threshold values and target values specified in the resource request). Similarly, resource ranges of 12.6-21.0 gigahertz and 8.4-16.8 terabytes, 9.0-15.0 gigahertz and 6.0-12.0 terabytes, 6.6-11.0 gigahertz and 4.4-8.8 terabytes, 4.8-8.0 gigahertz and 3.2-6.4 terabytes, 4.2-7.0 gigahertz and 2.8-5.6 terabytes may be calculated for the second, third, fourth, fifth, and sixth virtual machines, respectively. In certain embodiments, separate asset weights may be designated for each the processing power and memory resource requirements. Other resources and asset weights are also possible.

As described herein, the placement arrangement for the virtual machines may be determined based on the calculated resource ranges (e.g., based on the threshold values, target values, and asset weights) with respect to the resources available on each host device. For instance, in certain situations, the first host device may have 35 gigahertz and 15 terabytes available, the second host device may have 18 gigahertz and 24 terabytes available, the third host device may have 27 gigahertz and 20 terabytes available, and the fourth device may have 11 gigahertz and 7 terabytes available. In embodiments, deployment of the virtual machines may prioritize accommodation of the target values (e.g., the high level of the resource range) of each virtual machine. In the event that the target resource values for each virtual machine cannot be accommodated, virtual machines may be placed on hosts with less resource contention, or on a host that achieves the threshold values (e.g., the low level of the resource range). For example, in one example placement arrangement, the first virtual machine may be placed on the third host device and allotted 27 gigahertz and 15 terabytes, the second virtual machine may be placed on the first host device and allotted 21 gigahertz and 9 terabytes, the third virtual machine may be placed on the second host device and allotted 13 gigahertz and 12 terabytes, the fourth virtual machine may be placed on the first host device and allotted 11 gigahertz and 6 terabytes, the fifth virtual machine may be placed on the second host device and allotted 5 gigahertz and 6.4 terabytes, and the sixth virtual machine may be placed on the 4th virtual machine and allotted 7 gigahertz and 5.6 terabytes. Other placement arrangements and methods of determining the placement arrangement of the assets are also possible.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing asset placement with respect to a shared pool of configurable computing resources, the method comprising:
   detecting, with respect to a set of assets comprising one or more of a set of virtual machines or a set of software application programs, a set of minimum resource values, of the set of assets, which includes at least one minimum resource value;
   detecting, with respect to the set of assets, a set of target first resource values, of the set of assets, which includes at least one target resource value, wherein the at least one target resource value exceeds the at least one minimum resource value;
   detecting, with respect to the set of assets, a set of asset weight values which indicates relative prioritization values for each asset of the set of assets;
   determining a placement arrangement for the set of assets using the set of minimum resource values, the set of target resource values, and the set of asset weight values, wherein determining the placement arrangement includes:
     determining a minimum resource value for a first asset of the set of assets exceeds a threshold capacity value for the shared pool of configurable computing resources;
     identifying, based on the set of asset weight values, a second asset to be resized, the second asset having a lowest asset weight value among the set of assets; and
   deploying the set of assets among the shared pool of configurable computing resources based on the placement arrangement, wherein deploying the set of assets includes resizing the second asset by lowering a quantity of resources allocated to the second asset, without lowering the quantity of resources below its minimum resource value, until there are enough resources on the shared pool of configurable computing resources to support the minimum resource value of the first asset being deployed.

2. The method of claim 1, wherein:
   the set of minimum resource values includes a set of threshold values for at least one of:
     a first set of processor resource values, or
     a first set of memory resource values; and
   the set of target resource values includes a set of target values for at least one of:
     a second set of processor resource values, or
     a second set of memory resource values.

3. The method of claim 1, wherein determining the placement arrangement for the set of assets includes:
   calculating a mathematical operation with respect to the set of target resource values on a host of the shared pool of configurable computing resources;
   ascertaining a first quantity of computing resources of the host; and
   evaluating the mathematical operation with respect to the first quantity of computing resources.

4. The method of claim 1, wherein determining the placement arrangement for the set of assets includes:
   determining more than one host of the shared pool of configurable computing resources has substantially the same processor capacity remaining; and selecting one of the more than one host of the shared pool of configurable computing resources to manage resource contention based on the set of asset weight values.

5. The method of claim 1, wherein determining the placement arrangement for the set of assets includes:
calculating a first mathematical operation of a first subset of the set of asset weight values for a first host of the shared pool of configurable computing resources;
calculating a second mathematical operation of a second subset of the set of asset weight values for a second host of the shared pool of configurable computing resources; and
comparing the first mathematical operation and the second mathematical operation.

6. The method of claim 1, wherein determining the placement arrangement for the set of assets includes:
determining the at least one target resource value exceeds a threshold value for the shared pool of configurable computing resources;
calculating a mathematical operation with respect to the set of target resource values on a host of the shared pool of configurable computing resources, wherein the mathematical operation uses the at least one minimum resource value instead of the at least one target resource value;
ascertaining a first resource quantity for the host; and
evaluating the mathematical operation with respect to the first resource quantity.

7. The method of claim 1, wherein determining the placement arrangement for the set of assets includes:
determining a first resource usage of the shared pool of configurable computing resources exceeds a threshold value for the shared pool of configurable computing resources;
identifying, based on the set of asset weight values, a third asset of the set of assets to resize; and
wherein placing the set of assets based on the placement arrangement includes:
resizing the third asset by altering a quantity of a resource allocated to the third asset.

8. The method of claim 1, further comprising:
detecting, with respect to a set of assets, a set of minimum resource values, of the set of assets, which includes at least one minimum resource value;
detecting, with respect to the set of assets, a set of target resource values, of the set of assets, which includes at least one target resource value, wherein the at least one target resource value exceeds the at least one minimum resource value; and
determining the placement arrangement for the set of assets using the set of minimum resource values and the set of target resource values.

9. The method of claim 1, wherein determining the placement arrangement for the set of assets includes:
managing an expected usage of a resource.

10. The method of claim 9, wherein managing the expected usage of the first resource includes:
determining a first candidate placement arrangement having a first expected usage of a first resource;
determining a second candidate placement arrangement having a second expected usage of the first resource; and
determining, by comparing the first expected usage and second expected usage of the first resource, the placement arrangement, wherein the placement arrangement includes one of the first candidate placement arrangement or second candidate placement arrangement.

11. The method of claim 1, further comprising:
sensing the set of assets includes a first asset which is capable of consuming additional resources;
sensing the set of assets includes a second asset which is capable of consuming additional resources;
determining, using the set of asset weight values, a first portion of excess resource capacity to allocate to the first asset;
determining, using the set of asset weight values, a second portion of excess resource capacity to allocate to the second asset;
allocating the first portion of excess resource capacity to the first asset; and
allocating the second portion of excess resource capacity to the second asset.

12. The method of claim 1, further comprising:
metering use of the computing resources based on the placement arrangement; and
generating an invoice based on the metered use.

13. A computer-implemented method for managing a set of assets with respect to a shared pool of configurable computing resources, the method comprising:
detecting, with respect to the set of assets, a set of asset weight values which indicates relative prioritization values for each asset of the set of assets, wherein the set of assets comprises one or more of a set of virtual machines or a set of software application programs deployed on one or more hosts in the shared pool of configurable computing resources;
determining a first resource usage of a first host in the shared pool of configurable computing resources exceeds a threshold capacity value for the first host;
identifying, based on the set of asset weight values, a first asset deployed on the first host to resize, the first asset having a lowest asset weight value among the set of assets deployed on the first host; and
resizing the first asset by altering a quantity of resources allocated to the first asset down to a value greater than or equal to its minimum resource value, wherein a second asset having a higher asset weight value than the first asset is allocated with its target resource value when enough resources become available in the first host.

* * * * *